April 14, 1959 R. ADLER 2,882,334

TELEVISION RECEIVER

Filed Aug. 16, 1952 3 Sheets-Sheet 1

INVENTOR:
ROBERT ADLER
BY Francis W. Crotty
HIS ATTORNEY.

April 14, 1959 R. ADLER 2,882,334

TELEVISION RECEIVER

Filed Aug. 16, 1952 3 Sheets-Sheet 2

INVENTOR:
ROBERT ADLER.

BY Francis W. Crotty

HIS ATTORNEY.

April 14, 1959 R. ADLER 2,882,334

TELEVISION RECEIVER

Filed Aug. 16, 1952 3 Sheets-Sheet 3

INVENTOR:
ROBERT ADLER
BY Francis W. Crotty
HIS ATTORNEY.

United States Patent Office 2,882,334

Patented Apr. 14, 1959

2,882,334

TELEVISION RECEIVER

Robert Adler, Northfield, Ill., assignor to Zenith Radio Corporation, a corporation of Delaware Application August 16, 1952, Serial No. 304,698

9 Claims. (Cl. 178—7.3)

This invention relates to television receivers and more particularly to synchronizing and automatic gain control systems for use in such receivers.

In the copending applications of Robert Adler, Serial No. 139,401, filed January 19, 1950, and issued August 5, 1952, as Patent 2,606,300, for "Electron-Discharge Devices," and Serial No. 267,826, filed January 23, 1952, and issued July 20, 1954, as Patent 2,684,404, for "Frequency Controllable Oscillating Systems," both assigned to the present assignee, there are disclosed and claimed a novel electron-discharge device and system for use as a syncronizing-control arrangement in a television receiver or the like. In the preferred embodiment, a two-section tube is employed, the first or control section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the second or power section of the tube, an electron beam is simultaneously subjected to a sinusoidal magnetic-deflection field energized from the line-frequency sweep output and to a slow lateral displacement in accordance with the balanced unidirectional control voltage developed between the two phase-detector anodes in the first section. In this manner, the duty cycles of two final anodes in the second section of the tube are caused to vary in accordance with the unidirectional control potential developed between the phase-detector anodes of the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control (AFC) phase-detector, line-frequency oscillator, and reactance tube, providing a substantial saving in comparison with conventional systems which usually employ three or more tubes to perform these functions.

In the copending applications of Robert Adler, Serial No. 242,509, filed August 18, 1951, and issued September 13, 1955, as Patent 2,717,972, for "Electron-Discharge Device," and Serial No. 314,373, filed October 11, 1952, for "Television Receiver," now Patent No. 2,814,801, issued November 26, 1957, both of which are assigned to the present assignee, there are disclosed and claimed a novel tube and system for obtaining both noise-immune synchronizing-signal separation and automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output current pulses corresponding to the synchronizing-pulse components of the applied composite video signals, and these output pulses drive the line-frequency and field-frequency scanning systems. The other plate electrode is utilized to develop an automatic gain control (AGC) potential which is then applied in a conventional manner to one or more of the early receiving stages. In order to insure the establishment of synchronizing-pulse output at the first plate electrode whenever the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all normal receiver-input signal levels, with the result that incorrect synchronizing-pulse clipping which might otherwise be caused by drift or misadjustment of the automatic gain control circuits is effectively precluded.

In the copending applications of John G. Spracklen, Serial No. 246,768, filed September 15, 1951, and issued October 23, 1956, as Patent 2,768,319, for "Electron-Discharge Device," and Serial No. 323,752, filed December 3, 1952, and issued October 5, 1955, as Patent 2,721,895, for "Television Receiver," both of which are assigned to the present assignee, there are disclosed and claimed a still further novel tube and system for combining certain features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last mentioned Adler tube is replaced by at least a pair of phase-detector plate electrodes symmetrically positioned behind the sync clipping aperture. A balanced comparsion signal is applied between the two phase-detector plates from the line-frequency scanning system of the receiver. When the desired condition of phase synchronism exists, the phase-detector plates are maintained at equal average potentials; however, upon deviation from synchronism, a balanced control potential indicative of the magnitude and direction of the deviation is developed. In accordance with a preferred embodiment, this system is employed in conjunction with a deflection tube oscillator, and the phase-detector plate electrodes are direct-coupled to the deflection electrodes of the oscillator to effect automatic frequency control.

While the tubes and systems described and claimed in the aforementioned copending applications are operative and afford numerous advantages over conventional synchronizing and automatic gain control systems, it has been found that certain difficulties of a practical nature may be encountered. Specifically, these systems have been found to provide stable synchronization under all normal operating conditions within the range of the automatic gain control system. However, some difficulties have been encountered under the abnormal operating condition in which the received signal is so weak that the automatic gain control system is powerless to establish the appropriate signal level at the input of the synchronizing control tube. Such a condition is encountered whenever the incoming signal is below a predetermined threshold level at which the receiving circuits, comprising the radio-frequency and intermediate-frequency amplifiers, are operated at full gain by virtue of the application of a minimum AGC bias. During reception of such extremely weak signals, synchronizing-pulse output to the phase-detector anodes is interrupted, and the receiver may lose synchronization.

It is therefore an important object of the present invention to provide a new and improved synchronizing system for use in a television receiver, of the type disclosed and claimed in the first-mentioned Adler applications and/or the above-identified Spracklen applications.

It is a more specific object of the invention to provide such a new and improved system in which loss of synchronization during reception of weak signals is effectively precluded, even beyond the range in which the automatic gain control system remains effective.

In accordance with the present invention, loss of synchronization during weak-signal reception is effectively precluded by providing a direct-current feedback circuit direct-coupled between the phase-detector output system and the deflection-control system of the control section of the tube. This network is effective to apply a compensating bias to the deflection-control system whenever the beam current to the phase-detector output system is materially reduced, thus tending to restore beam current to the output system and maintain synchronization of the receiver scanning systems. Preferably, direct voltage variations appearing in the receiver and/or the video-signal translating circuits as a result of the automatic gain control action are utilized to derive an additional compensating bias for the deflection-control system in order further to improve the synchronization stability.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is employed to denote the varying unidirectional or unipolar signal after detection. The term "direct-coupling" is descriptive of a circuit coupling capable of transmitting direct or unidirectional voltages, and a "direct connection" is a direct-coupling of substantially zero impedance.

Figure 1:
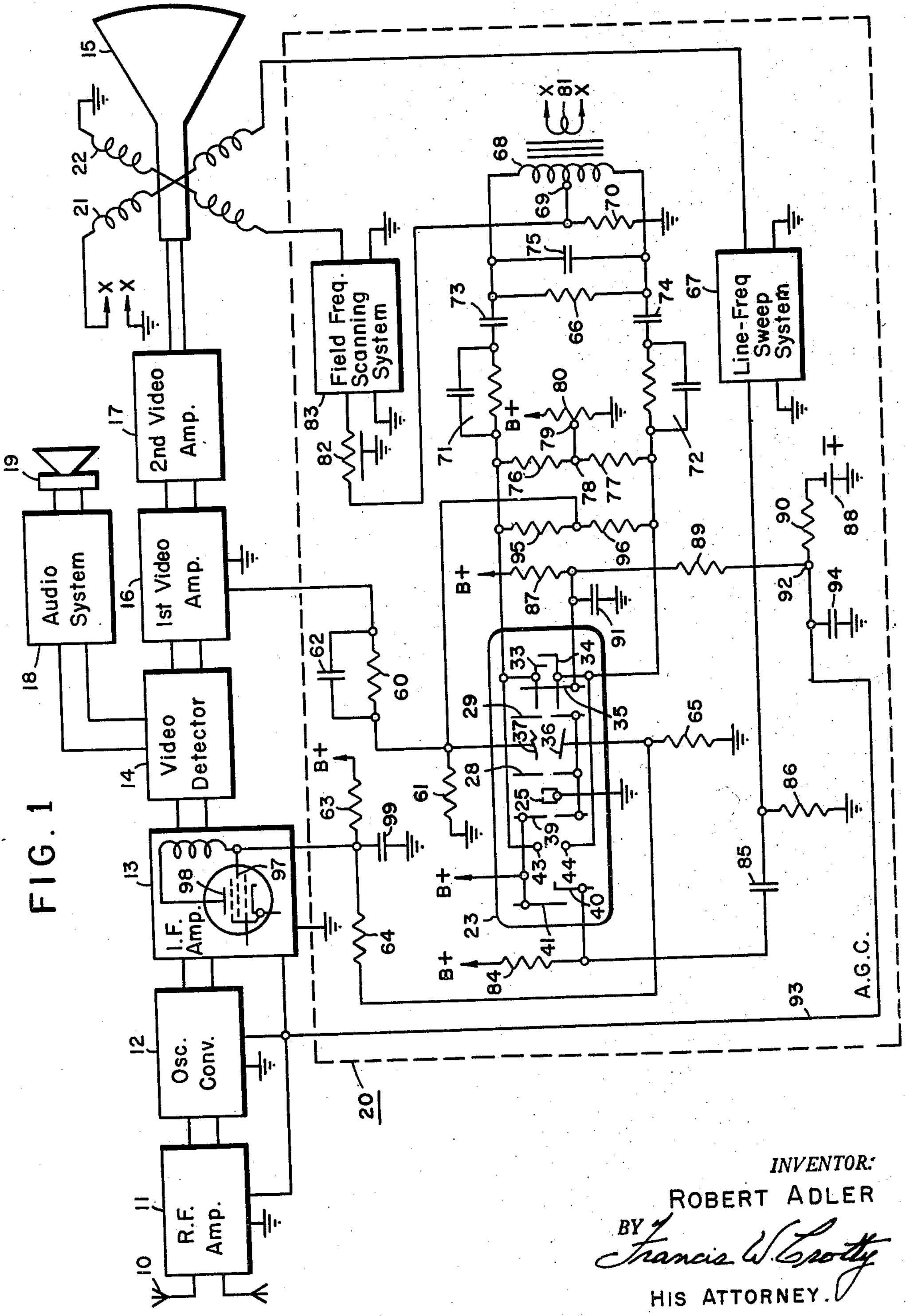
Figure 1 is a schematic circuit diagram of a television receiver embodying the present invention.

In the television receiver of Figure 1, incoming composite television signals are received by an antenna 10 and impressed on a radio-frequency amplifier 11. The amplified composite television signals from radio-frequency amplifier 11 are supplied to an oscillator-converter 12, and the intermediate-frequency output signals from oscillator-converter 12 are impressed on an intermediate-frequency amplifier 13. The amplified intermediate-frequency composite television signals are demodulated by a video detector 14, and the video-signal components of the resulting composite video signals are impressed on the input circuit of an image-reproducing device 15, such as a cathode-ray tube, after amplification by first and second video amplifiers 16 and 17. Intercarrier sound signals developed in the output circuit of first video amplifier 16 are impressed on suitable sound circuits 18, which may comprise a limiter-discriminator and audio and power amplifier stages, and the amplified audio signals are impressed on a loud-speaker 19 or other sound-reproducing device.

Composite video signals from first video amplifier 16 are supplied to a synchronizing and automatic gain control system 20 embodying the present invention, and suitable line-frequency and field-frequency scanning signals are impressed on appropriate line-frequency and field-frequency deflection coils 21 and 22 associated with image-reproducing device 15.

The basic construction and operation of synchronizing and automatic gain control system 20 are specifically described in the above-identified Spracklen applications. This system is built around a special purpose electron tube 23 of novel construction which combines the several functions of noise-immune synchronizing-signal separation, automatic-frequency-control phase-detection, generation of line-frequency oscillations, frequency control of the line-frequency oscillations, and automatic gain control generation. To facilitate the following description of the construction and operation of the receiver of Figure 1, reference is now made to Figures 2–5.

Figures 2, 3:
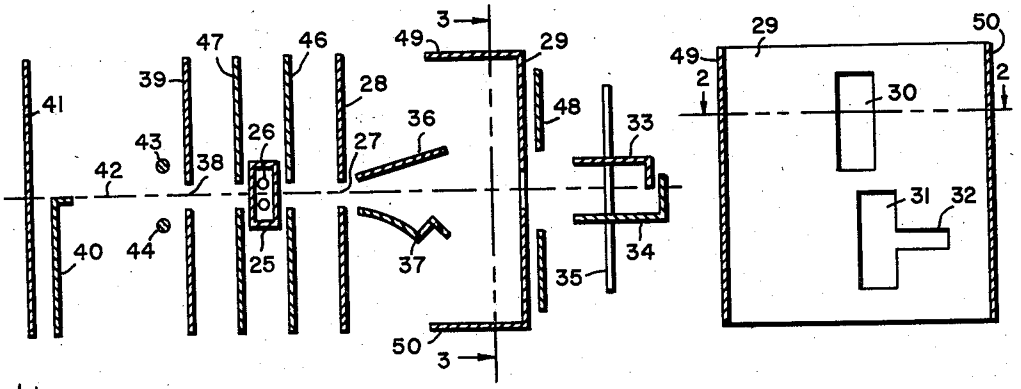
Figure 2 is a cross-section view of a special-purpose electron tube adapted to be used in the receiver of Figure 1.
Figure 3 is a cross-sectional view taken along the line 3—3 of Figure 2.

In Figure 2, which is a cross-sectional view of special purpose electron tube 23, two separate sheet-like electron beams of substantially rectangular cross-section are projected from opposite electron-emissive surfaces of a common elongated cathode 25 which is provided with an indirect heater element 26. In the right-hand or control section of the tube, space electrons originating at cathode 25 are projected through a slot 27 in an accelerating electrode 28 toward a target electrode or intercepting anode 29 which is provided with a pair of rectangular apertures or slots 30 and 31, best visualized from the view of Figure 3. Preferably, slots 30 and 31 are arranged in overlapping alignment in a direction parallel to cathode 25, and a slot 31 may be provided with a lateral extension 32 for a purpose to be hereinafter described. A pair of receptor electrodes 33 and 34, constituting a first output electrode system, are provided for collectively receiving space electrons which pass through slot 30, and an additional plate electrode 35, constituting a second output electrode system, is provided for receiving space electrons which pass through slot 31. Receptor electrodes 33 and 34 are preferably constructed as "controllector" electrodes each having a deflection-control portion and a collector portion and adapted to be biased at equal positive operating voltages in the manner described and claimed in the copending application of Robert Adler, Serial No. 263,737, filed December 28, 1951, and issued April 10, 1956, as Patent 2,741,721, for "Electron-Discharge Device," and assigned to the present assignee. However, output electrodes 33 and 34 may be formed in any other desired manner, for example as a pair of simple transverse collecting plates such as those described in the above-identified Spracklen application, without departing from the spirit of the present invention.

A deflection-control system, illustrated as a pair of electrostatic-deflection electrodes or plates 36 and 37, is provided between accelerating electrode 28 and target electrode 29. Deflectors 36 and 37 extend for the full height of the beam to constitute a single input electrode system associated with both output electrode systems. At least the active deflector 37 is preferably of louvered construction as shown in Figure 2 and described and claimed in the copending application of Robert Adler, Serial No. 277,399, filed March 19, 1952, and issued October 5, 1954, as Patent 2,691,117, for "Electron-Discharge Device," and assigned to the present assignee, in order to minimize the amount of beam current drawn by the active deflector under strong impulse noise conditions. The passive or companion deflector 36 may also advantageously be constructed in the same manner (not shown) to avoid deleterious effects of secondary electron emission resulting from impingement of space electrons thereon under certain operating conditions. Preferably the tube is to constructed and operated that the thickness of the beam at the plane of target electrode 29 is less than the width of slot 30.

In the left-hand or power section of the tube, electrons originating at cathode 25 are projected through a slot 38 in an accelerating electrode 39 toward an output system comprising a pair of anodes 40 and 41 respectively having active portions on opposite sides of the tube axis or undeflected path 42 of this second beam. A pair of electrostatic-deflection electrodes 43 and 44 are provided between slot 38 and anodes 40 and 41.

Those elements thus far described constitute the essential elements of a special purpose electron tube suitable for use in the synchronizing and AGC system 20 of the receiver of Figure 1. However, refinements of this electrode system may be made in accordance with well known practices in the art. Thus, for example, focusing electrodes 46 and 47, each having a slot narrower than the emissive surfaces of cathode 25, may be interposed between the cathode and either or both of the accelerating electrodes 28 and 39 and maintained at or near cathode potential to restrict electron emission to a narrow central portion of the respective emissive surfaces. Moreover, it may be advantageous to include one or more suppressor electrodes, such as electrode 48, between intercepting anode 29 and electrodes 33, 34 and 35, and to form target electrode 29 with flanges 49 and 50 directed toward the electron gun comprising cathode 25 and accelerating electrode 28, for the purpose of avoiding spurious effects attributable to secondary electron emission. Further, the particular construction of deflection-control systems 36, 37 and 43, 44 may be varied; for example, one or more of the deflection electrodes may be replaced by plural electrodes biased at different potentials, such as cathode potential and the D.C. supply voltage of the associated apparatus with which the tube is employed. Preferably, however, deflection electrodes 43 and 44 in the left-hand section of the tube are constructed as simple parallel rods or wires to minimize the intercepting area presented thereby to stray electrons. Still further, either or both of the sheet-like electron beams may be split into two or more beams subjected to a common transverse deflection field or to synchronous deflection fields without departing from the spirit of the invention.

The electrode system is mounted within a suitable envelope (not shown) which may then be evacuated and gettered in accordance with well known procedures in the art. The entire structure may conveniently be included in a miniature glass envelope, a number of the electrode connections being made internally of the envelope in a manner to be made apparent, for the purpose of minimizing the number of external circuit connections.

In operation, deflection plates 36 and 37 are biased to direct the electron beam in the right-hand section of the tube to an electron-impervious portion of target electrode 29, for example, to a solid portion of electrode 29 on the side of aperture 30 nearer deflection plate 36. When an input signal of positive polarity is applied to deflection plate 37, or alternatively when an input signal of negative polarity is applied to deflection plate 36, the beam is deflected at least partially into slots 30 and 31 whenever the input signal exceeds a predetermined amplitude level. During such intervals, current is permitted to flow in the output circuits associated with electrodes 33, 34 and 35, provided these electrodes are maintained at a proper potential to receive electrons, while during other intervals no such current flow can occur. Moreover, when the input signal exceeds a predetermined higher amplitude, the beam is deflected beyond slot 30 of intercepting electrode 29, and current flow to output electrodes 33 and 34 is again interrupted. At still greater input-signal amplitudes, the current flowing to output electrode 35 is first diminished as the beam is deflected into extension 32 of slot 31 and then extinguished as the beam sweeps beyond extension 32.

Figure 4:
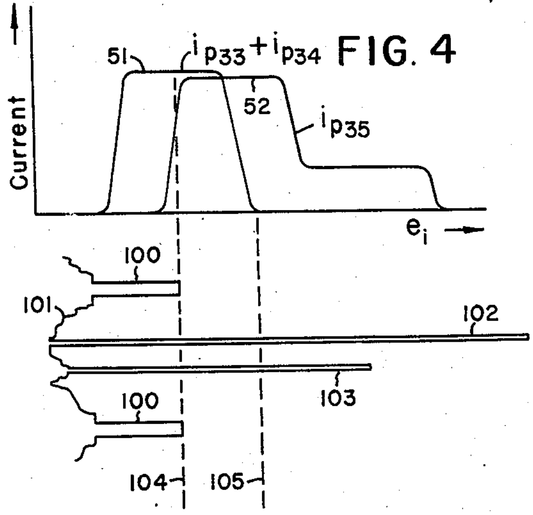
Figures 4–6 are graphical representations of certain operating characteristics of the tube shown in Figures 2 and 3.
Figure 5:
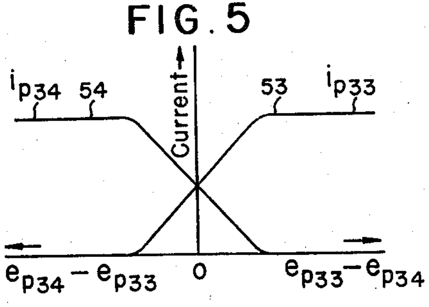

The transfer characteristics of the input deflection-control system 36, 37 with respect to the output system comprising electrodes 33 and 34 and with respect to output electrode 35 are represented by curves 51 and 52 respectively of Figure 4. Curve 51 represents the total current ($i_{p33}+i_{p34}$) flowing to controller electrodes 33 and 34 as a function of the input voltage $e_i$ applied to deflection-control system 36, 37. Curve 52 shows the current $i_{p35}$ to output electrode 35 as a function of the input voltage $e_i$. The magnitudes and shapes of curves 51 and 52 are determined by the geometry of slots 30 and 31; the particular operating characteristics illustrated in Figure 4 are those obtained for a specific embodiment and are not intended to be construed as representing required relative or absolute magnitudes or shapes.

Receptor electrodes 33 and 34, which each comprise electrically connected control and collector portions and are therefore termed "controllector" electrodes, are disposed in effectively symmetrical relation with respect to the tube axis 42 passing through the center of slot 30 and, in operation, are preferably biased to equal positive unidirectional operating potentials. The collector portions conjointly define a collector system for collectively receiving substantially all electrons projected through slot 30, and the control portions serve as a deflection-control system responsive to applied signals for controlling the space current distribution between the collector portions. The control characteristics of controllector electrodes 33 and 34 are shown qualitatively in Figure 5, in which curve 53 represents the current $i_{p33}$ to electrode 33 and curve 54 the current $i_{p34}$ to electrode 34 as functions of the potential difference $e_{p33}-e_{p34}$ between the two controllector electrodes. As described in Patent 2,741,721, it has been found that the current distribution between controllector electrodes 33 and 34 may be made substantially independent of the position at which the beam enters slot 30 of target electrode 29. This desirable condition may be obtained over a broad range of positive bias potentials for controllector electrodes 33 and 34, as for example between one-fifth and one-third of the voltage applied to target electrode 29. When so operated, target electrode 29 and controllector electrodes 33 and 34 form an electrostatic lens for focusing the beam, whenever it passes through slot 30, to converge on the collector system at a location substantially independent of the input signal applied between deflection-control electrodes 36 and 37. Thus, in practice, it has been found that the operating characteristics of Figure 5 remain substantially unchanged throughout a fairly large range of positive bias potentials for controllector electrodes 33 and 34. Curves 53 and 54 intersect symmetrically, for an effectively symmetrical physical construction, and the current is divided equally between electrodes 33 and 34 when their potentials are equal. Secondary electrons originating at controllector electrodes 33 and 34 are effectively trapped in the enclosed region between these electrodes.

The left-hand portion of the structure of Figure 2 constitutes a conventional deflection-control electrode system. The electron beam projected through slot 38 of accelerating electrode 39 is directed either to anode 40 or to anode 41 in accordance with the instantaneous potential difference between electrostatic-deflection electrodes 43 and 44. If a sinusoidal signal wave is applied between deflection electrodes 43 and 44, the beam is caused cyclically to sweep back and forth transversely across axis 42 and is thereby switched back and forth between anodes 40 and 41. Consequently, since full beam current is switched from one anode to the other in a relatively small fraction of a cycle, oppositely phased square-wave output signals are produced in load circuits respectively associated with anodes 40 and 41; in the preferred embodiment of the invention, only one square-wave output signal is required, and either anode 40 or anode 41 is employed to develop the output signal while the other is directly connected to accelerating electrode 39. It is preferred that anode 40 be employed as the output anode in order to avoid difficulties arising from secondary electron emission.

Electron-discharge device 23 of the receiver of Figure 1 is constructed in the manner shown and described in connection with Figure 2–5. Composite video signals from first video amplifier 16 are supplied to deflection plate 37, hereinafter termed the active deflector, in the right-hand section of device 23 by means of a voltage-divider network comprising resistors 60 and 61, active deflector 37 being connected to the junction between resistors 60 and 61. A condenser 62 is connected in parallel with resistor 60. Cathode 25 of device 23 is connected to ground. Accelerating electrodes 28 and 39, target electrode 29, and second anode 41 are connected together (preferably internally of the envelope) and to a suitable source of positive unidirectional operating potential conventionally designated B+. Deflection plate 36, hereinafter termed the companion deflector, is connected to a tap on a voltage divider comprising resistors 63, 64, and 65 connected between B+ and ground.

Synchronizing system 20 also comprises a line-frequency sweep system 67, which may include a discharge tube and a power output stage, for impressing suitable deflection currents on line-frequency deflection coil 21 associated with image-reproducing device 15. Controllector electrodes 33 and 34 of device 23 are respectively coupled to opposite terminals of a coil 68, having a center tap 69 which is returned to ground through a resistor 70, by means of anti-hunt networks comprising shunt-connected resistor-condenser combinations 71 and 72, and condensers 73 and 74. A damping resistor 66 and a tuning condenser 75 are connected in parallel with coil 68, and a conductive load impedance, such as a pair of equal resistors 76 and 77, is connected between electrodes 33 and 34, the junction 78 between resistors 76 and 77 being connected to a suitable positive bias potential source, as by connection to a tap 79 of a voltage divider 80 connected between B+ and ground. Coil 68 is energized by a feedback coil 81 which is preferably connected in series between line-frequency deflection coil 21 and ground, as indicated by the terminal designations X—X. Center tap 69 of coil 68 is also coupled through an integrator 82 to a field-frequency scanning system 83 which provides suitable deflection currents to field-frequency deflection coil 22 associated with image-reproducing device 15.

Controllector electrodes 33 and 34 are directly connected to electrostatic-deflection electrodes 43 and 44 respectively in the left-hand section of device 23, and anode 40 is connected to B+ through a load resistor 84 and to line-frequency sweep system 67 through a differentiating network comprising a series condenser 85 and a shunt resistor 86.

Plate electrode 35 is connected to B+ through a resistor 87 and is also returned through series-connected resistors 89 and 90 to a suitable source of negative unidirectional operating potential, here shown as a battery 88 whose positive terminal is grounded, which may be for example about 80 volts negative with respect to cathode 25. An integrating condenser 91 is connected between plate electrode 35 and ground. The junction 92 between resistors 89 and 90 is connected to the automatic gain control (AGC) lead 93 and is shunted by a filter condenser 94, and AGC lead 93 is connected to one or more of the receiving circuits comprising radio-frequency amplifier 11, oscillator-converter 12, and intermediate-frequency amplifier 13.

If desired, either the tube structure or the external circuitry, or both, may be modified to compensate for decentering of the reproduced image attributable to the unique phase relations between the incoming synchronizing pulses and the scanning signals encountered in the present system, as described and claimed in the copending application of Robert Adler, Serial No. 272,200, filed February 18, 1952, and issued February 12, 1957, as Patent 2,781,468, for "Television Receiver," and assigned to the present assignee.

The system thus far described is essentially the same as those disclosed in one or more of the above-identified copending applications. In accordance with the present invention, the system is modified in two important respects. First, a feedback network comprising a pair of series-connected equal resistors 95 and 96 is provided between phase-detector anodes 33 and 34, the junction between resistors 95 and 96 being direct-coupled, preferably by means of a direct electrical connection, to active deflector 37. Secondly, the screen grids 97 and anodes 98 of one or more of the intermediate-frequency amplifier tubes (of which only one is shown) are supplied with operating potential from source B+ through resistor 63, which also constitutes a portion of the voltage divider employed to supply companion deflector 36 with its positive operating bias. A condenser 99 is provided to bypass screen grids 97 and anodes 98 to ground.

The construction and operation of synchronizing and automatic gain control system 20 are generally similar to those disclosed and claimed in certain of the above-identified copending applications. Positive-polarity composite video signals, including the direct-voltage components, from the output circuit of first video amplifier 16 are applied to active deflector 37 by means of the voltage divider network comprising resistors 60 and 61 and condenser 62. Deflectors 36 and 37 are so biased that the beam projected through aperture 27 of accelerating electrode 28 is normally directed to an electron-impervious portion of target electrode 29, as for instance, to a solid portion of target electrode 29 on the side of apertures 30 and 31 nearer deflection plate 36, or to the left of aperture 30 in the view of Figure 3. Application of the positive-polarity composite video signals to active deflector 37 causes a transverse deflection of the beam in accordance with the instantaneous signal amplitude. The operating potentials for the various electrodes are so adjusted that different longitudinal portions of the beam are respectively deflected entirely into aperture 30 and partially into aperture 31 of intercepting anode 29 in response to the synchronizing-signal components of the applied composite video signals; the beam is entirely intercepted by target electrode 29 and/or deflection plate 36 during video-signal intervals. As a consequence, beam current is only permitted to flow to electrodes 33, 34 and 35 during synchronizing-pulse intervals.

The left-hand section of device 23 serves as a line-frequency oscillator in the line-frequency scanning system. Oppositely phased sinusoidal signals are applied to deflection electrodes 43 and 44 by means of coil 68 and condenser 75 which are tuned to the line-scanning frequency to operate as a ringing circuit or filter excited by means of coil 81 inserted in series with the line-frequency deflection coil 21. Consequently, the beam in the left-hand section of device 23 is caused to sweep back and forth between anode 40 and 41, so that a rectangular-wave output voltage is developed across resistor 84. This output voltage is differentiated by means of condenser 85 and resistor 86, and the resulting positive-polarity or negative-polarity pulses are employed to trigger line-frequency sweep system 67, depending on the construction of that sweep system.

At the same time, the same oppositely phased sinusoidal voltage waves applied to deflection electrodes 43 and 44 are impressed on controllector electrodes 33 and 34, respectively, in the right-hand section of device 23. As previously explained, current flow to controllector electrodes 33 and 34 is restricted to synchronizing-pulse intervals by virtue of the geometry of target electrode 29. The current distribution between electrodes 33 and 34 is dependent upon the instantaneous potential difference between these electrodes during the synchronizing-pulse intervals.

The oppositely phased sinusoidal signals developed at the terminals of coil 68 by excitation of the tuned circuit 68, 75 in response to the sweep current through coil 81 serve as comparison signals in a balanced phase-detector. If the comparison signals are properly phased with respect to the incoming line-frequency synchronizing-signal pulses, the instantaneous potentials of controllector electrodes 33 and 34 are equal at the time of the arrival of each synchronizing pulse, and the space current passing through aperture 30 is equally divided between electrodes 33 and 34, with the result that no unidirectional control potential difference is developed between the controllector electrodes. On the other hand, if the comparison signals and the incoming line-frequency synchronizing-signal pulses are not in proper phase synchronism, the instantaneous potentials of the two controllector electrodes 33 and 34 at the time of arrival of each line-frequency synchronizing-signal pulse are different, so that the beam currents collected by electrodes 33 and 34 are unequal and a unidirectional control signal is developed between the controllector electrodes. Since controllector electrodes 33 and 34 are directly connected to deflection electrodes 43 and 44 respectively in the left-hand section of device 23, the beam in the left-hand section is accelerated or retarded in its progress from anode 40 to anode 41 and back in response to the unidirectional control signal. As a result, the positive and negative half-cycles of the output voltage wave developed across resistor 84 are altered in time duration with respect to each other in accordance with the unidirectional control potential difference between electrodes 33 and 34. The quasi-square wave thus developed is differentiated to provide triggering pulses for line-frequency sweep system 67. Since the triggering pulses are derived by diffrentiating the leading or trailing edges of the output quasi-square wave, and since the timing of these leading and trailing edges is varied in accordance with the developed AFC potential, phase synchronism of the line-frequency sweep system with the incoming line-synchronizing pulses is assured.

In order to obtain the desired automatic-frequency-control action, it is essential that a condition in which the comparison signals lag the incoming synchronizing-signal pulses result in an increase in the frequency of the local oscillator comprising the left-hand section of device 23, line-frequency sweep system 67, and feedback circuit 81, 68. This operation is insured by the common direct connections for both the sinusoidal comparison signals and the unidirectional AFC potential from controllector electrodes 33 and 34 to deflection electrodes 43 and 44 respectively. It is possible, for a given construction of sweep system 67, that the system may fail to oscillate altogether due to incorrect phasing of the comparison signals and the triggering pulses for the line-frequency sweep system; this condition may be corrected by merely reversing the terminal connections of feedback coil 81 or of coil 68, or, if separate leads are provided for anodes 40 and 41, by reversing the circuit connections of these two anodes. Proper pull-in action is automatically insured for any condition for which oscillation is obtained.

To obtain field-frequency synchronization, the output currents to controllector electrodes 33 and 34 are effectively combined by means of resistor 70 connected in the common ground return for controllector electrodes 33 and 34. The combined output appearing across resistor 70 is integrated by integrator 82 to provide a control signal for field-frequency scanning system 83. The beam current through aperture 30, representing the clipped sync pulses, is first used in its entirety to provide a balanced line-frequency control potential, and then again in its entirety to synchronize the field scansion. The use of an output load impedance connected in a common return circuit for the phase-detector electrodes for deriving field-frequency driving pulses is specifically described and claimed in the copending application of Robert Adler, Serial No. 260,221, filed December 6, 1951, and issued March 27, 1956, as Patent 2,740,002, for "Synchronizing Control Apparatus," and assigned to the present assignee. It is of course also possible to employ a separate plate electrode for the sole purpose of developing field-frequency synchronizing-signal pulses for application to the field-frequency scanning system, as described in the above-identified Spracklen patents.

Plate electrode 35 develops a unidirectional control potential indicative of the peak amplitude of the composite video signals for application to the receiving circuits preceding the video detector to effect automatic gain control of the receiver. Plate electrode 35 is conditioned to receive substantially all beam current directed thereto by virtue of its connection to B+ through resistor 87. During video-signal intervals, however, the input signal amplitude at active deflector 37 is not sufficient to cause deflection of space electrons through slot 31, with the result that space current is only permitted to flow to plate electrode 35 during synchronizing-pulse intervals. Noise pulses occurring during either synchronizing-pulse intervals or video-signal intervals are generally of much greater amplitude than the peak amplitude of the synchronizing pulses and thus cause deflection of the beam beyond slot 31. This results in an aperture-gating characteristic, as distinguished from the now-familiar time-gated automatic gain control system, with the automatic gain control potential being dependent substantially only on the peak amplitude of the synchronizing pulses. Series-connected resistors 87, 89 and 90 constitute a voltage divider between B+ and battery 88 and are so proportioned that, in the absence of space current to plate electrode 35, the potential of AGC lead 93 is at or near ground, depending upon the required bias voltage for receiving circuits 11, 12 and 13. The potential of junction 92 varies in accordance with the space current to plate electrode 35 and is then filtered by condenser 94 and applied to AGC lead 93 to effect automatic gain control of the receiver. In other words, plate electrode 35 is coupled to an intermediate point on the voltage divider comprising resistors 87, 89 and 90 to cause the potential at another intermediate point 92 to vary in response to variations in the peak amplitude of the synchronizing pulses applied to active deflector 37 from first video amplifier 46. Certain features of the automatic gain control system are specifically disclosed and claimed in the copending application of John G. Spracklen, Serial No. 281,708, filed April 11, 1952, now abandoned, for "Television Receiver," and assigned to the present assignee.

Certain important advantages of the system may best be understood from a consideration of Figures 2–4. Since aperture 30 in intercepting anode 29 has definite fixed boundaries, it is apparent that deflection of the beam beyond aperture 30 results in interception thereof by anode 29. Consequently, extraneous noise pulses, which are generally of much larger amplitude than any desired component of the composite video signals, are not translated to controllector electrodes 33 and 34, and loss of synchronization due to extraneous impulse noise is substantially precluded. This operation is apparent from operating characteristic 51 of Figure 4. When composite video signals comprising synchronizing-pulse components 100 and video-signal components 101 are impressed on active deflection plate 37, extraneous noise pulses 102, 103 which are of greater peak amplitude than the synchronizing-pulse components by an amount exceeding the voltage represented by the spacing between vertical lines 104 and 105, result in deflection of the beam beyond aperture 30; consequently, these noise pulses are not translated to the output circuits associated with controllector electrodes 33 and 34, and substantial noise immunity is achieved. Aperture 30 is preferably of constant length in a direction parallel to cathode 25, in order to provide output current pulses of constant amplitude for application to scanning system 83 and to insure proper AFC action in spite of such rapid fluctuations in the amplitude of the synchronizing pulses as are occasionally encountered.

The operation of the automatic gain control system may perhaps best be understood by a consideration of operating characteristic 52 of Figure 4. Space electrons are permitted to pass to plate electrode 35 only when the electron beam is laterally deflected at least partially into aperture 31. In an equilibrium condition, the deflection-control system is so biased that the peaks of the synchronizing-signal pulses are impressed on the rising portion of characteristic 52, as indicated by vertical line 104. When the signal amplitude increases, the peaks of the synchronizing pulses 100 instantaneously extend further to the right, and the space current to plate electrode 35 is increased. This results in an increase in the negative unidirectional control potential applied to the receiving circuits 11, 12 and 13, thus reducing the gain of these circuits and thereby restoring the amplitude of the input signal applied to active deflection plate 37 to the equilibrium value indicated in the drawing. On the other hand, if the signal amplitude instantaneously decreases, the negative gain-control potential decreases and the gain of the receiving circuits is increased to restore equilibrium. Noise pulses 102 of sufficient amplitude to swing the beam beyond slot extension 32 are prevented from contributing to the automatic gain control potential by virtue of the finite boundaries of aperture 31. Noise pulses of lesser amplitude than pulse 102, such as pulse 103, contribute only very slightly to the automatic gain control potential by virtue of the restricted access to plate electrode 35 afforded by slot extension 32. Consequently, the aperture gating characteristic 52 of the AGC system provides substantial noise immunity which in practice has been found favorably comparable with that obtained by the use of conventional time-gated automatic gain control systems. Extension 32 of slot 31 is provided for the purpose of avoiding paralysis of the AGC system, as described in Patent 2,717,972.

It is also possible to employ time-gating for the AGC system, if desired, as for example in the manner described in copending application Serial No. 314,373, which issued November 26, 1957, as Patent No. 2,814,801.

Since it is desirable for the synchronizing current pulses developed at controllector electrodes 33 and 34 to be of constant amplitude, it is preferred that the peaks of the synchronizing-pulse components 100 be impressed on characteristic 51 at a constant-current region of that characteristic; in other words, the synchronizing-pulse components of the applied composite video signals should cause deflection of the upper portion of the beam entirely into aperture 30. At the same time, because of the automatic gain control action, the peaks of the synchronizing-pulse components 100 are normally superimposed on a sloping portion of characteristic 52; in other words, the synchronizing-pulse components of the applied composite video signals cause deflection of the lower portion of the beam only partially into aperture 31. By disposing apertures 30 and 31 in overlapping or staggered alignment in a direction parallel to cathode 25, as illustrated in Figure 3, it is insured that whenever the automatic gain control action establishes the equilibrium condition illustrated by the graphical representation of Figure 4, synchronizing current pulses of constant amplitude are developed at controllector electrodes 33 and 34; in other words, the clipping level of the synchronizing-signal separator is automatically adjusted in spite of varying signal strengths at the receiver input. The direct voltage-to-alternating voltage transmission ratio of the voltage-divider network comprising resistors 60 and 61 and condenser 62 may be adjusted to a value of less than unity to preclude receiver paralysis under certain abnormal operating conditions, in the manner described and claimed in the copending application of John G. Spracklen, Serial No. 259,063, filed November 30, 1951, and issued July 20, 1954, as Patent 2,684,403, for "Television Receiver" and assigned to the present assignee.

The operation of the system described above is exceedingly stable and reliable, as compared with presently known systems, under all normal operating conditions for which the received composite television signals exceed a predetermined threshold level at which the automatic gain control system goes into effect to limit further growth of the signal. In other words, as long as the received signals are of sufficient amplitude to operate the automatic gain control system, scanning synchronization is assured. However, the present system is generally different from conventionally employed synchronizing control arrangements in one important respect. When a self-biased synchronizing signal separator is employed, reduction of the signal level at the input to the separator is accompanied by a change in the clipping level due to the self-biasing action, and this function is performed independently of the automatic gain control system. In the present system, however, the functions of automatic gain control and synchronizing-signal separation are inextricably interrelated; by virtue of the tube geometry, as explained above, beam current to receptor or controllector electrodes 33 and 34 during the synchronizing-pulse intervals is automatically assured whenever the automatic gain control system is operative. However, should the received signals become so weak that the automatic gain control system becomes ineffective, for the simple reason that the receiving circuits are already operating at full gain, the beam in the right-hand section of control tube 23 may fail to reach the sync clipping slot 30, thus resulting in a material reduction or a complete failure of beam current to the output electrode system 33, 34. Under such weak-signal conditions, in the absence of compensating arrangements, the automatic frequency control action fails and the line-frequency sweep system 67 may operate independently of the incoming synchronizing pulses. Moreover, field-frequency synchronizing pulse output may also be interrupted, resulting in loss of field-frequency as well as line-frequency synchronization.

In accordance with the present invention, the performance of the system is stabilized under weak-signal conditions by providing an automatic compensation to insure against material reduction of beam current to output electrode system 33, 34. In the embodiment of Figure 1, two separate compensating circuits are provided. The first employs direct-current feedback from output electrode system 33, 34 to active deflector 37, while the second applies a compensating voltage derived from intermediate-frequency amplifier 13 to companion deflector 36.

More particularly, direct-current feedback from the output electrode system to the active deflector is provided by means of series-connected resistors 95 and 96 and the direct connection from the junction of these resistors to active deflector 37. Resistors 95 and 96, while of high value, are small relative to load resistors 76 and 77; for example, resistors 95 and 96 may be from 0.5 to 1 megohm each as compared with 3.3 megohms each for resistors 76 and 77.

During normal operation, when the automatic gain control system is effective to maintain the peak amplitude of the input signal applied to active deflector 37 substantially constant, a predetermined nominal beam current flows during synchronizing-pulse intervals to output electrode system 33, 34. As a consequence, the potential of the junction between resistors 95 and 96 also assumes a predetermined nominal value. When the level of the received composite television signals falls below the threshold at which the automatic gain control system loses its power to increase the gain of the receiving circuits, the beam current to output electrode system 33, 34 is materially reduced and may even be completely interrupted, and the potential of the junction between resistors 95 and 96 rises accordingly. This potential rise is applied to active deflector 37 by virtue of the direct electrical connection, thus varying the bias of the deflection-control system in a sense tending to restore nominal beam current flow to output electrodes 33, 34.

An important feature of this direct-current feedback network resides in its substantial inactivity during normal operating conditions when the automatic gain control system is effective. To a first degree of approximation, resistors 76 and 77 may be disregarded since they are large relative to resistors 95 and 96. If resistor 61 were infinitely large, any change in beam current to output electrodes 33, 34 could only be returned to ground through resistor 60, through which the composite video signals are applied to the active deflector 37. Since the active deflector controls the current to electrodes 33 and 34 over a certain range of signal amplitudes, an admittance equal to the derivative of the beam current to electrodes 33, 34 with respect to the active deflector voltage appears at active deflector 37 looking toward feedback network 95, 96. The numerical value of this admittance is dependent on signal conditions; for normal operation when the automatic gain control is effective, a fixed nominal beam current is established to electrodes 33 and 34, and the admittance is zero. On the other hand, under weak signal conditions when the automatic gain control system loses control, the admittance is positive. As a consequence, the feedback system only goes into effect to vary the clipping level with respect to the applied composite video signals when the automatic gain control system is exhausted. Since the entire phase-detector current is employed to produce a voltage drop across resistor 60, which is the source impedance feeding the active deflector, this system provides the maximum compensating action which may be obtained.

Actually, resistors 76 and 77 absorb a small part of the change in output current, and resistor 61 may not be made infinitely large since a direct-voltage reduction at active deflector 37 with respect to the output electrode of first video amplifier 16 is required. Consequently, the actual condition obtained only approximates that set forth by the above analysis.

Figure 6:
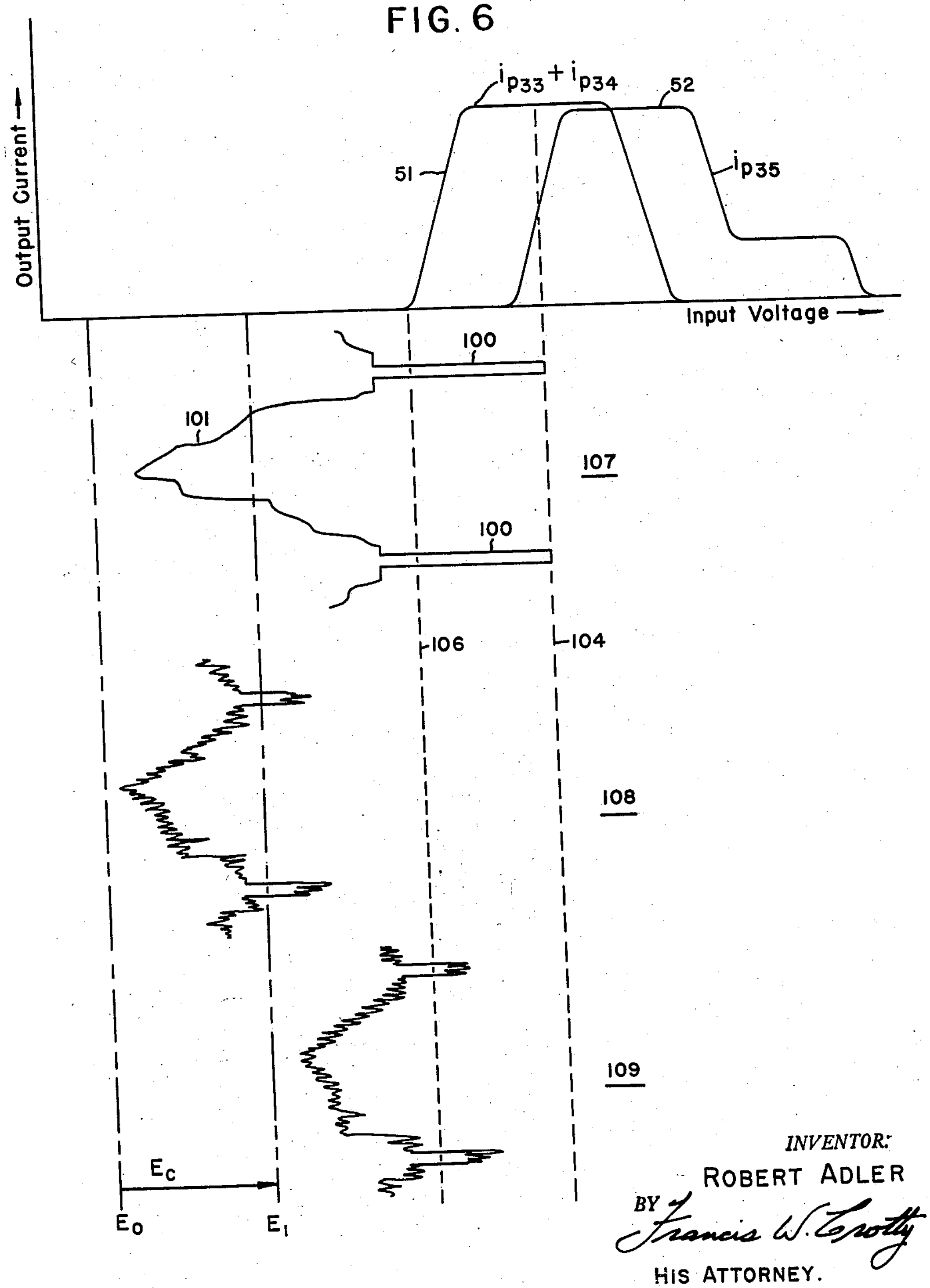

The action of the direct-current feedback circuit in automatically varying the bias of the deflection-control system to provide weak signal compensation may be readily understood from the graphical representation of Figure 6, in which the operating characteristics of Figure 4 are reproduced on an enlarged scale. In Figure 6, the initial bias of the active deflector is indicated by dot-dash line $E_0$ and a marginal signal, i.e., one just strong enough to provide full nominal beam current to output electrodes 33 and 34 with minimum AGC action (radio- and intermediate-frequency amplifiers operating at full gain), is represented at 107. Under this condition, as just pointed out, the active deflector presents zero admittance to the feedback circuit, and the initial bias $E_0$ remains unaltered. During reception of still weaker signals such as that shown at 108, the peak amplitude of the synchronizing pulses falls below the clipping level 106 established by the tube geometry and the initial bias $E_0$, and beam current to electrodes 33 and 34 is materially reduced or even interrupted; under extreme weak signal conditions, even the random noise components of the input signal applied to the active deflector may be insufficient to deflect the beam into the sync clipping slot, and complete loss of synchronization may ensue.

Any material reduction in the average beam current flowing to electrodes 33 and 34, however, gives rise to a corresponding increase in the voltage appearing at these electrodes, and, with the direct-current feedback circuit of the present invention, this voltage increase is applied by means of resistor 60 (Figure 1) to the active deflector as a compensating bias $E_c$, thus raising the actual bias of the active deflector to the level indicated by the double-dot-dash line $E_1$. Superposition of even extremely weak composite video signals on this increased operating bias once again forces the synchronizing pulses above the predetermined clipping level 106, as indicated at 109, thus restoring receiver synchronization. In other words, the nominal clipping level with respect to the composite video input signals is varied by an amount $E_c$ in a direction tending to restore the flow of nominal beam current to electrodes 33 and 34.

The louvered construction of the active deflector plays an important part in insuring the full benefits of the present invention. As explained in Patent 2,691,117, this construction materially reduces the amount of beam current which can be drawn by the active deflector, thus avoiding undesirable charge-up of coupling condenser 62 (Figure 1) in response to impulse noise. As a consequence, a coupling resistor 60 of larger ohmic resistance may be employed with a louvered active deflector than with one of conventional construction such as a simple flat or curved deflection plate. Since the amount of compensating bias which may be developed by the direct-current feedback circuit is dependent on the resistance of element 60, across which the compensating bias voltage is developed, the use of a larger coupling resistor results in more efficacious weak signal compensation.

The feedback network also has an additional salutary effect in relieving or eliminating a different type of abnormal operating condition. If for any reason the beam current to output electrode system 33, 34 should increase sharply, the average potential of electrodes 33 and 34 drops proportionately. Such a condition may be encountered on extremely strong input signals before the AGC system has had time to go into effect to restore the normal input signal level to active deflector 37; under such circumstances, the beam may be deflected into slot 30 during video-signal, rather than synchronizing-signal, intervals. Any current drawn by deflectors 43 and 44 in the power section contributes to the voltage drop and may even perpetuate the faulty condition, by virtue of the direct connections from deflectors 43 and 44 to receptor electrodes 33 and 34 respectively. However, with the feedback network comprising resistors 95 and 96 with their junction connected to active deflector 37, this phenomenon (which may conveniently be termed "collapse") is precluded, since any drop in average voltage of electrodes 33 and 34 is immediately applied to active deflector 37 to lower the positive bias of that electrode and thereby tend to restore normal sync clipping action.

Similar control effects may be derived and applied in other ways to the deflection-control system of the control section of tube 23 to vary the clipping level to accommodate weak signals below the threshold at which the AGC system loses control. For example, it may be possible to include auxiliary deflecting electrodes respectively connected to output electrodes 33 and 34 and disposed on the same side of the normal beam path between active deflector 37 and target electrode 29, in such a manner that the average of the potential variations of these auxiliary deflectors is effective to provide the desired weak-signal compensation.

As an additional feature of the invention, a compensating voltage may also be applied to companion deflector 36 in a sense tending to maintain nominal beam current to output electrode system 33, 34. In the embodiment of Figure 1, such an additional or auxiliary compensating voltage is derived from one or more of the screen grid and plate circuits of intermediate-frequency amplifier 13. Under weak signal conditions, the AGC bias on the intermediate-frequency amplifier tubes is removed, so that full space current is drawn. As a result, the direct or average potentials of the screen grids 97 and plates 98 fall by comparison with the normal operating condition when the automatic gain control system is effective. This voltage drop is applied to companion deflector 36 through the voltage divider comprising resistors 64 and 65. This decreases the bias potential applied to companion deflector 36 and results in a shift in the static or average beam position in a sense tending to restore nominal beam current during synchronizing-pulse intervals to electrodes 33 and 34.

Additional or auxiliary compensation may also be achieved in other ways. For example, the cathodes of the intermediate-frequency amplifier tubes may be returned to ground through a cathode bias resistor for the first video amplifier. Such an arrangement is illustrated in the fragmentary schematic diagram of Figure 7.

Figure 7:
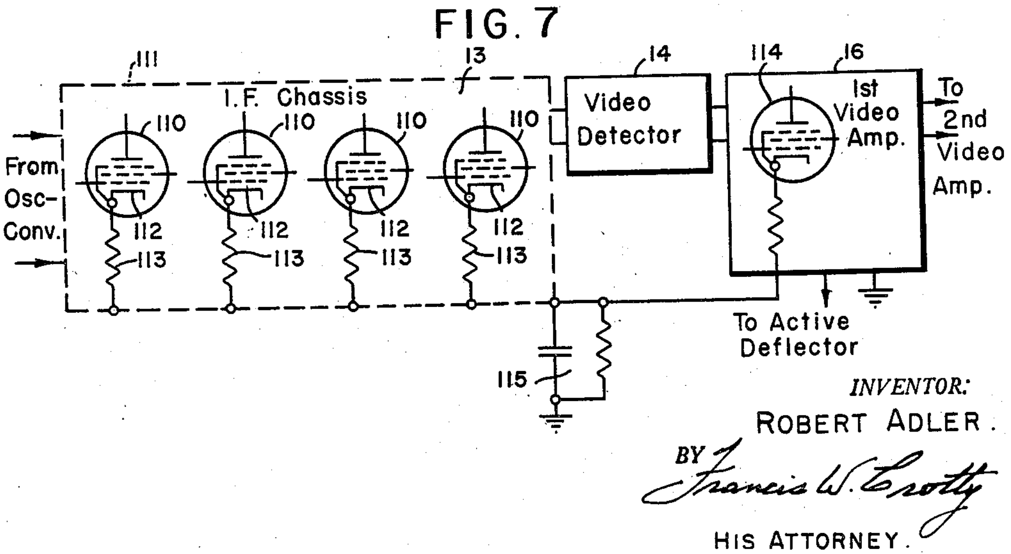
Figure 7 is a fragmentary schematic circuit diagram of a portion of a television receiver, illustrating an alternative feature of the invention.

In Figure 7, intermediate-frequency composite television signals from oscillator-converter 12 (Figure 1) are applied to intermediate-frequency amplifier 13. IF amplifier 13 may comprise a plurality of cascade-connected amplifier tubes 110 mounted on a separate chassis 111 of conductive material, with the cathodes 112 returned to chassis 111 through respective bias resistors 113. Intermediate-frequency amplifier 13 is then coupled to a video detector 14, and the unipolar composite signals there developed are applied to first video amplifier 16 which may comprise an electron-discharge device 114 having its cathode returned to ground through a self-biasing network 115 comprising parallel-connected resistance and capacity elements. Biasing network 115 is also interposed between IF chassis 111 and ground. The other connections of the receiver of Figure 7 may be identical with those disclosed in connection with Figure 1.

In normal operation, the control grids of intermediate-frequency amplifier tubes 110 are maintained at a suitable operating bias under the influence of the automatic gain control system. At weaker signal levels, the AGC bias supplied to the control grids of intermediate-frequency amplifier tubes 110 is reduced to permit operation at increased gain. Consequently, the current flow through tubes 110 is increased under weak-signal conditions. This increase in current is employed to develop a positive bias voltage across network 115 which, being connected to the cathode of video amplifier tube 114, results in a decrease in space current drawn by that tube. This in turn is reflected as an increase in the average plate voltage of first video amplifier tube 114, and this voltage increase is applied to active deflector 37 (Figure 1) to vary the clipping level with respect to the applied composite video signals in a proper sense to restore normal sync clipping action.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; an electron-discharge device having first and second output electrode systems and having a single input system associated with both of said output electrode systems; means coupling said video detector to said input system for applying said unipolar composite video signals thereto; synchronizing signal separating means, including said input system and said first output electrode system and having a predetermined threshold level and a predetermined nominal clipping level with respect to said composite video signals, for separating said synchronizing components from said video components; an automatic gain control system comprising means, including said input system and said second output electrode system, responsive to amplitude variations of said composite television signals for developing a control potential and for applying said control potential to said receiving circuits to maintain a peak amplitude of the input signals applied to said input system substantially constant and above said nominal clipping level whenever said composite television signals exceed said predetermined threshold level; means including a direct-current feedback circuit direct-coupled from said first output electrode system to said input system for automatically varying said clipping level with respect to said composite video signals in response to amplitude variations of said composite television signals in the range below said predetermined threshold level; and utilization means for said synchronizing components coupled to said first output electrode system.

2. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; a beam-deflection tube having first and second output electrode systems and having a single input system associated with both of said output electrode systems; means direct-coupling said video detector to said input system for applying said unipolar composite video signals thereto; synchronizing-signal separating means, including said input system and said first output electrode system and having a predetermined threshold level and a predetermined nominal clipping level with respect to said composite video signals for separating said synchronizing components from said video components; an automatic gain control system comprising means, including said input system and said second output electrode system, responsive to amplitude variations of said composite television signals for developing a control potential and for applying said control potential to said receiving circuits to maintain the peak amplitude of the input signals applied to said input system substantially constant and above said nominal clipping level whenever said composite television signals exceed said predetermined threshold level; means including a direct-current feedback circuit direct-coupled from said first output electrode system to said input system for automatically varying said clipping level with respect to said composite video signals in response to amplitude variations of said composite television signals in the range below said predetermined threshold level; and utilization means for said synchronizing components coupled to said first output electrode system.

3. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; an electron-discharge device having first and second output electrode systems and having a single input system associated with both of said output electrode systems; means coupling said video detector to said input system for applying said unipolar composite video signals thereto; synchronizing-signal separating means, including said input system and said first output electrode system and having a predetermined threshold level and a predetermined nominal clipping level with respect to said composite video signals, for separating said synchronizing components from said video components; an automatic gain control system comprising means, including said input system and said second output electrode system, responsive to amplitude variations of said composite television signals for developing a control potential and for applying said control potential to said receiving circuits to maintain the peak amplitude of the input signals applied to said input system substantially constant and above said nominal clipping level whenever said composite television signals exceed said predetermined threshold level and establish a nominal electron current flow to said first output electrode system; means responsive to amplitude variations of said composite television signals in the range below said predetermined threshold level, including means responsive to material reduction of said electron current flow, for automatically varying said clipping level with respect to said composite video signals; and utilization means for said synchronizing components coupled to said first output electrode system.

4. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; an electron-discharge device having first and second output electrode systems and having a single input system associated with both of said output electrode systems; means coupling said video detector to said input system for applying said unipolar composite video signals thereto; synchronizing-signal separating means, including said input system and said first output electrode system and having a predetermined threshold level and a predetermined nominal clipping level with respect to said composite video signals, for separating said synchronizing components from said video components; an automatic gain control system comprising means, including said input system and said second output electrode system, responsive to amplitude variations of said composite television signals for developing a control potential and for applying said control potential to said receiving circuits to maintain the peak amplitude of the input signals applied to said input system substantially constant and above said nominal clipping level whenever said composite television signals exceed said predetermined threshold level to establish a nominal electron current flow to said first output electrode system; means coupled to said receiving circuits and responsive to amplitude variations of said composite television signals in the range below said predetermined threshold level for automatically varying said clipping level with respect to said composite video signals; means including a direct-current feedback network direct-coupled from said first output electrode system to said input system and responsive to material reduction of said electron current for also automatically varying said clipping level with respect to said composite video signals; and utilization means for said synchronizing components coupled to said first output electrode system.

5. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; a beam-deflection tube system having a predetermined threshold level comprising a source of space electrons for projecting an electron beam, a deflection-control system for subjecting said beam to a transverse deflection field in response to an applied input signal, and an output electrode system for receiving said beam only during intervals when it is directed along a path intermediate two predetermined limiting paths; means for applying said composite video signals to said deflection-control system; automatic gain control means coupled to said beam deflection tube and responsive to amplitude variations of said composite television signals for developing a control potential and for applying said control potential to said receiving circuits to maintain the peak amplitude of the input signals applied to said deflection-control system substantially constant whenever said composite television signals exceed said predetermined threshold level; means for biasing said deflection-control system to direct said beam to said output electrode system in response to applied input-signal components equal to said constant peak amplitude; means including a direct-current feedback network direct-coupled from said output electrode system to said deflection-control system for automatically varying the bias of said deflection-control system, in response to amplitude variations of said composite television signals in the range below said predetermined threshold level, in a direction tending to maintain the peak excursion of the composite video signals applied to said deflection-control system between the limiting amplitudes corresponding to the aforesaid limiting beam paths; and utilization means for said synchronizing components coupled to said output electrode system.

6. In a television receiver: a source of composite television signals including video components and synchronizing components; receiving circuits for translating said composite television signals; a video detector coupled to said receiving circuits for demodulating said composite television signals to develop unipolar composite video signals including said video and synchronizing components, with the synchronizing components having a peak amplitude greater than any of the video components; a beam-deflection tube system having a predetermined threshold level comprising a source of space electrons for projecting an electron beam, an active deflector and a companion deflector on opposite sides of the path of said beam for subjecting said beam to a transverse deflection field in response to an applied input signal, and an output electrode system for receiving said beam only during intervals when it is directed along a path intermediate two predetermined limiting paths; means for applying said composite video signals to said active deflector; automatic gain control means coupled to said beam-deflection tube and responsive to amplitude variations of said composite television signals for developing a control potential and for applying said control potential to said receiving circuits to maintain the peak amplitude of the input signals applied to said active deflector substantially constant whenever said composite television signals exceed said predetermined threshold level; means for biasing said active and companion deflectors to direct said beam to said output electrode system in response to applied input-signal components equal to said constant peak amplitude; means including a direct-current feedback network direct-coupled from said output electrode system to said active deflector for automatically varying the bias of said active deflector, in response to amplitude variations of said composite television signals in the range below said predetermined threshold level, in a direction tending to maintain the peak excursion of the composite video signals applied to said active deflector between the limiting amplitudes corresponding to the aforesaid limiting beam paths; and utilization means for said synchronizing components coupled to said output electrode system.

7. In a television receiver: a source of composite television signals including video and synchronizing components; receiving circuits for translating said composite television signals; means including a video detector coupled to said receiving circuits for developing unipolar composite video signals including said video and synchronizing components, with the synchronizing components having a peak amplitude greater than any of the video components; a beam-deflection tube system having a predetermined threshold level comprising an elongated cathode for projecting a sheet-like electron beam of substantially rectangular cross-section along a predetermined reference plane, a deflection-control system including an active deflector and a companion deflector on opposite sides of said reference plane, a target electrode intercepting said reference plane and provided with a pair of slots in overlapping alignment in a direction parallel to said cathode, a pair of receptor electrodes for collecting electrons projected through one of said slots, and a plate electrode for receiving electrons projected through the other of said slots; means for applying said composite video signals to said deflection-control system; means including said plate electrode for developing an automatic gain control potential indicative of said peak amplitude and for applying said automatic gain control potential to said receiving circuits to maintain said beam in a position intercepting said one slot in response to said synchronizing components whenever said composite television signals exceed said predetermined threshold level, thus establishing a predetermined nominal beam current flow to said receptor electrodes; means including an output circuit for applying unidirectional operating potential to said receptor electrodes; means including a direct-current feedback network direct coupled from said receptor electrodes to one of said deflectors for varying its average potential, whenever said composite television signals fall below said predetermined threshold level and beam current flow to said receptor electrodes is materially reduced, in a sense tending to restore said nominal beam current flow; and utilization means for said synchronizing components coupled to said output circuit.

8. In a television receiver: a source of composite television signals including video and synchronizing components; receiving circuits for translating said composite television signals; means including a video detector coupled to said receiving circuits for developing unipolar composite video signals including said video and synchronizing components, with the synchronizing components having a peak amplitude greater than any of the video components; a beam-deflection tube system having a predetermined threshold level comprising an elongated cathode for projecting a sheet-like electron beam of substantially rectangular cross-section along a predetermined reference plane, a deflection-control system including an active deflector and a companion deflector on opposite sides of said reference plane, a target electrode intercepting said reference plane and provided with a pair of slots in overlapping alignment in a direction parallel to said cathode, a pair of receptor electrodes for collecting electrons projected through one of said slots, and a plate electrode for receiving electrons projected through the other of said slots; means for applying said composite video signals to said deflection-control system; means including said plate electrode for developing an automatic gain control potential indicative of said peak amplitude and for applying said automatic gain control potential to said receiving circuits to maintain said beam in a position intercepting said one slot in response to said synchronizing components whenever said composite television signals exceed said predetermined threshold level, thus establishing a predetermined nominal beam current flow to said receptor electrodes; means including an output circuit for applying unidirectional operating potential to said receptor electrodes; a pair of resistors series-connected between said receptor electrodes; means direct-coupling said active deflector to the junction of said resistors to apply direct-voltage variations developed at said junction, whenever said composite television signals fall below said predetermined threshold level and beam current flow to said receptor electrodes is materially reduced, to said active deflector in a sense tending to restore said nominal beam current flow; and utilization means for said synchronizing components coupled to said output circuit.

9. In a television receiver: a source of composite television signals including video and synchronizing components; receiving circuits for translating said composite television signals; means including a video detector coupled to said receiving circuits for developing unipolar composite video signals including said video and synchronizing components, with the synchronizing components having a peak amplitude greater than any of the video components; a beam-deflection tube system having a predetermined threshold level comprising an elongated cathode for projecting a sheet-like electron beam of substantially rectangular cross-section along a predetermined reference plane, a deflection-control system including an active deflector and a companion deflector on opposite sides of said reference plane, a target electrode intercepting said reference plane and provided with a pair of slots in overlapping alignment in a direction parallel to said cathode, a pair of receptor electrodes for collecting electrons projected through one of said slots, and a plate electrode for receiving electrons projected through the other of said slots; means for applying said composite video signals to said deflection-control system; means including said plate electrode for developing an automatic gain control potential indicative of said peak amplitude and for applying said automatic gain control potential to said receiving circuits to maintain said beam in a position intercepting said one slot in response to said synchronizing components whenever said composite television signals exceed said predetermined threshold level, thus establishing a predetermined nominal beam current flow to said receptor electrodes; means including an output circuit for applying unidirectional operating potential to said receptor electrodes; means including a direct-current feedback network direct-coupled from said receptor electrodes to said active deflector for varying the average potential of said active deflector, whenever said composite television signals fall below said predetermined threshold level and beam current flow to said receptor electrodes is materially reduced, in a sense tending to restore said nominal beam current flow; means coupled to said receiving circuits for varying the average potential of said companion deflector, in response to amplitude variations of said composite television signals, in a sense tending to restore said nominal beam current flow; and utilization means for said synchronizing components coupled to said output circuit.

References Cited in the file of this patent

UNITED STATES PATENTS

| | | |
|---|---|---|
| 2,159,818 | Plaistowe | May 23, 1939 |
| 2,211,860 | Plaistowe | Aug. 20, 1940 |
| 2,369,749 | Nagy et al. | Feb. 20, 1945 |
| 2,606,300 | Adler | Aug. 5, 1952 |
| 2,631,230 | Marsh | Mar. 10, 1953 |
| 2,635,184 | Cotsworth | Apr. 14, 1953 |
| 2,684,403 | Spracklen | July 20, 1954 |
| 2,691,697 | Adler | Oct. 12, 1954 |
| 2,736,768 | Tourshou et al. | Feb. 28, 1956 |
| 2,784,249 | Richman | Mar. 5, 1957 |

OTHER REFERENCES

Spracklen application Serial No. 281,708, filed April 11, 1952.